Dec. 15, 1959     C. P. GALANOT     2,917,095
TRACTION DEVICE FOR A VEHICLE WITH TIRES OR THE LIKE
Filed Jan. 27, 1958     3 Sheets-Sheet 1
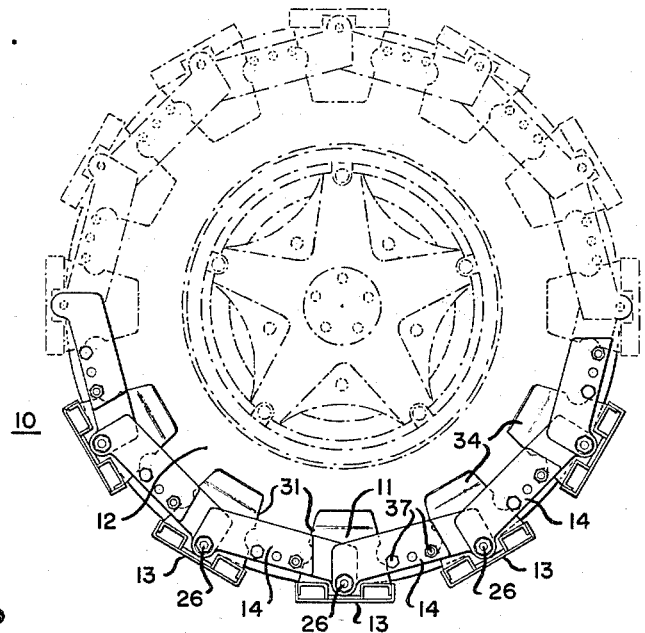
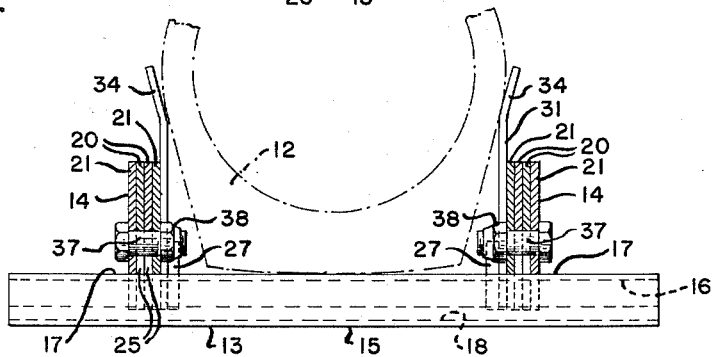
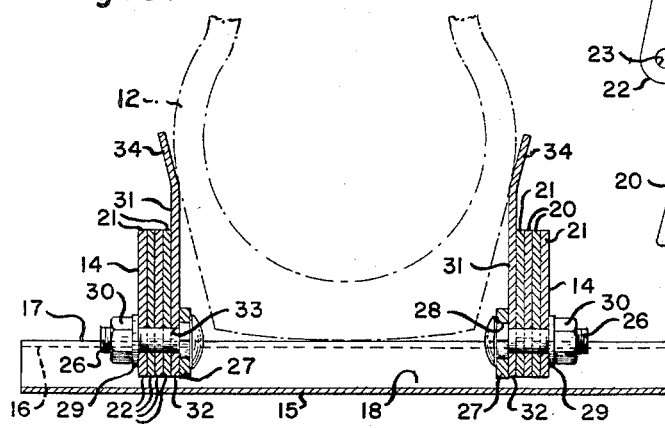
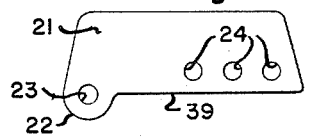
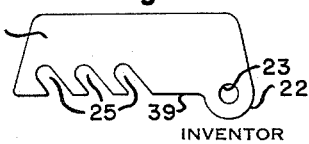
INVENTOR
Camille P. Galanot
his Attorneys Dec. 15, 1959  C. P. GALANOT  2,917,095
TRACTION DEVICE FOR A VEHICLE WITH TIRES OR THE LIKE
Filed Jan. 27, 1958  3 Sheets-Sheet 2

INVENTOR
Camille P. Galanot
his attorneys

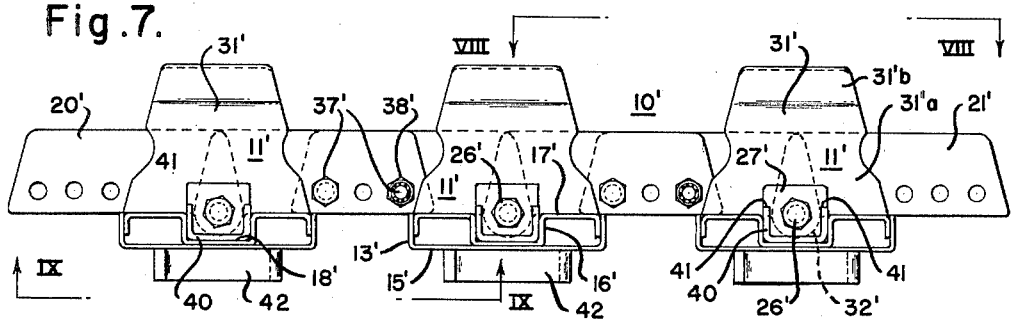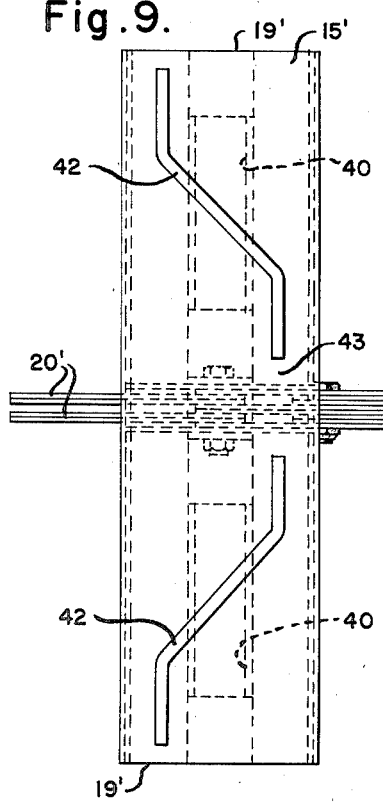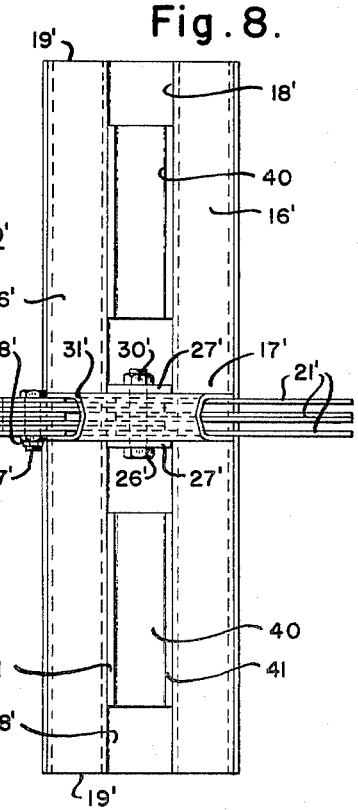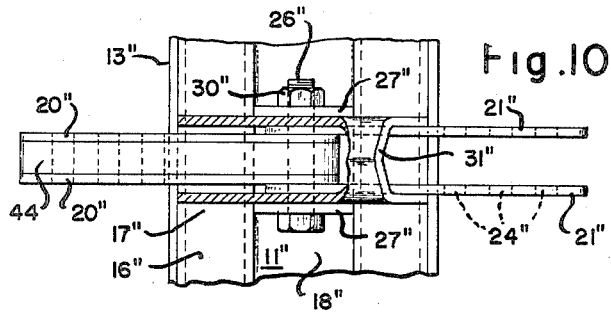

and from the accom-

United States Patent Office 2,917,095
Patented Dec. 15, 1959

2,917,095

TRACTION DEVICE FOR A VEHICLE WITH TIRES OR THE LIKE

Camille P. Galanot, Alliance, Ohio

Application January 27, 1958, Serial No. 711,383

10 Claims. (Cl. 152—225)

This invention relates to a traction device having units rigidly connected together in endless order to fit around the tires of a vehicle and provide improved or added traction and support therefor. More particularly, this invention pertains to such traction devices and units having a relatively simpler construction. In this connection, reference is made to the applicant's prior copending application Serial No. 598,198 filed July 16, 1956, now Patent No. 2,821,443.

The instant traction device comprises units preferably of like construction which are capable of being rigidly connected to adjoining such units to form an endless track around the tires or wheels of a vehicle, whether those tires or wheels are single in nature, or dual, and further, whether those tires or wheels are employed in single axle or tandem axle constructions. Such traction devices articulate freely about a pivot in the unit for the purpose of conforming to the peripheral portion of such tires or wheels so engaged and when units thereof are in a straight line, such units act as a rigid beam against any force trying to push the treads thereof inwardly toward the inside of area surrounded by the traction device itself. In that way, the wheels and axles of such vehicles are protected against damage. In the units making up traction devices of my invention, the parts used are relatively few and may be constructed by stamping or other simple forming operations. Further, they are of relatively lighter weight for comparable strength and involve less work in connection with the assembling, disassembling and handling thereof.

Other objects, features and advantages will be apparent from the following description panying drawings, which are illustrative only, in which:

Figure 1 is a view in side elevation of a single wheel type of vehicle to which one traction device embodiment of this invention has been applied;

Figure 2 is a view in cross section of the embodiment shown in Figure 1 taken in the direction of line II—II of Figure 4;

Figure 3 is a view in cross section of the embodiment shown in Figure 1 taken in the direction of line III—III of Figure 4;

Figure 7 is a view in side elevation of three units of a further embodiment of a traction device of this invention applicable to a dual tire or wheel type of vehicle;

Figure 8 is a plan view taken along line VIII—VIII of Figure 7;

Figure 9 is a plan view taken along line IX—IX of Figure 7;

Figure 10 is a view of a portion of a still further traction device unit embodiment of this invention;

Figure 11 is a view of one form of connector plate utilizable in the foregoing embodiments; and Figure 12 is a view of a lighter service connector plate utilizable in a traction device of this invention.

Figure 4:
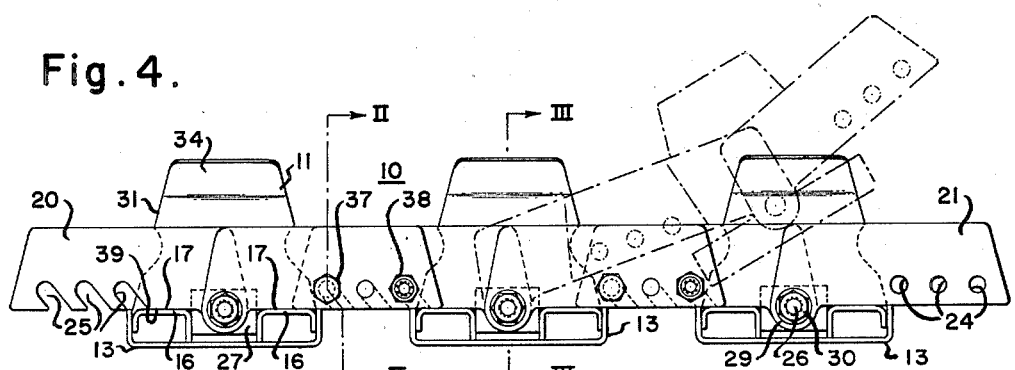
Figure 4 is a view in side elevation of three units of the embodiment shown in Figure 1.
Figure 5:
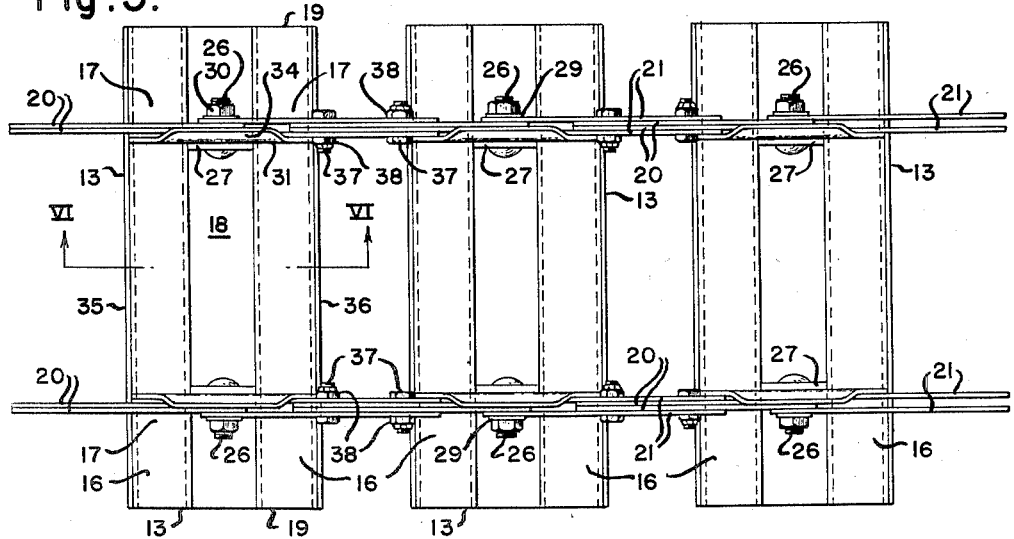
Figure 5 is a plan view of the units shown in Figure 4.

The embodiment illustrated in Figures 1 to 6 in the form of traction device 10 is applied to single wheels on a vehicle and comprises a plurality of rigidly joined units 11. While shown as applied to a single tire or wheel, it is clear that additional units may be added to device 10, or subtracted therefrom, to accommodate different wheel diameters or to go around longitudinally spaced wheels such as those on tandem axles as illustrated in Figure 5 of my aforesaid application Serial No. 598,198, now Patent No. 2,821,443. As shown, the traction device 10 fits a tire 12 and provides improved traction and support for the vehicle to which tires 12 are attached whether that vehicle is moving forward or backward, or standing still.

Each unit 11 comprises a tread 13 and two opposed guide and connector plate subassemblies 14 connected to tread 13 in the engagement relation shown in Figures 2 and 3 relative to tire 12. Each tread 13 comprises a bottom plate 15 in the form of a channel to which are secured longitudinally spaced smaller opposed channels 16 secured thereto as by welding, the respective tops of the channels 16 forming a flat top surface 17 for the tread. A transverse depression 18 extends centrally between the sides 19 of each such tread 13. The metal forms used in each unit 11 are relatively simple and may be inexpensively formed and assembled. At the same time, they are relatively light, strong and self-clearing of soil and foreign material in the course of operation.

Each of the subassemblies 14 is preferably provided with an inner pair of connector plates 20 and an outer pair of connector plates 21, although single connector plates extending in opposed directions may be used in a single subassembly. In the illustrated embodiment, those connector plates are trapezoidal in form with horizontal top and bottom edges and with the inner and outer ends thereof converging upwardly, as shown in Figures 12 and 11. At each of the inner ends of each of the connector plates there is a downwardly extending pivot lug 22 having a pivot opening 23 therein. A series of connector openings 24 are provided in longitudinally spaced relation adjacent the outer end of the respective connector plates. For ease of connection and disconnection, at least the inner connector plates 20 may have those connector openings 24 in the form of slots 25 for lighter duty services. Such slots 25 preferably are inclined downwardly and toward the inner end of the respective connector plate in which they may be provided. For heavier duty service, all of the connector plates preferably should be provided with bolt openings in the nature of openings 24, or the equivalent.

The respective pairs of connector plates are pivotally connected to the tread 13 in their respective unit 11 by a pivot pin 26 passing through the registering pivot holes 23. Pivot pin 26 is fixed in place by a pivot plate 27 which in turn is fixed to tread 13 as by being welded in depression 18. As shown, pivot pin 26 is in the form of a carriage bolt with the head thereof toward tire 12 on the tire side of the connector plates, the pivot plate 27 being provided with a pivot plate opening 28 for the passage of the carriage bolt or pivot pin 26. A washer 29 and nut 30 complete the pivot pin assembly and hold the connector plates in place for the articulation action provided thereby about pivot 26. In addition, a guide 31 is provided having a downwardly projecting pivot lug 32 with an opening 33 therein for the passage of pivot 26 therethrough. The upper portion 34 of guide 31 is inclined away from the tire side of the particular subassembly 14 toward the opposite side. The tire side of guide 31 preferably engages the side of tire 12 and tire 12 further engages the top of tread 13 thereby moving the traction device 10 in the course of use when tire 12 is moving. The lower portion of the side of guide 31 adjoining the connector plates 21 and 20 is flat upwardly for a distance sufficient to enable full articulation to take place about the axis of pivot 26 without interference from guide 31, as illustrated in Figures 1 and 4. The fore and aft lower edges of the guide 31 are preferably secured to the top surface 17 of tread 13 as by means of welding.

The inner pair of connector plates 20 extends beyond the front 35 of tread 13 in its particular unit 11 and the outer pair of connector plates 21 extends beyond back edge 36 of such tread 13. Thereby, each unit can readily be rigidly connected to an adjoining unit in a longitudinal direction to complete the device 10 as shown in Figure 5 wherein the forwardly extending inner pair of connector plates 30 fits between the outer pair of rearwardly extending connector plates 21 of the unit 11 immediately ahead and so on around the entire device 10. Connector bolts 37 extend through the registering holes 24 and slots 25, where slots are used, such connector bolts being provided with lock nuts 38, a pair of such bolts being used for each end of each connector plate subassembly to insure a rigid connection with the adjoining unit. The longitudinal spacing between one or more of the units may be varied at will in accordance with the size of the tire or wheel to be accommodated and the service to be performed. Such adjustability enables various sizes of tire or wheel to be served by one size of traction device and further enables a selected amount of tread surface to be applied to a given tire arrangement. For example, two units 11 will be most closely coupled together when the two adjoining connector openings nearest to the pivot of that unit are secured to the corresponding registering openings in the adjoining unit connector plates by connector bolts 37 (see the right-hand side of Figure 6); intermediate spacing is obtained when the units are coupled as shown in Figures 4 and 5; and the most distant spacing is obtained when the two outermost adjoining connector openings of each are utilized by the adjoining units (see the left-hand side of Figure 6). The terms "horizontal," "vertical," "front," "back," "upper" and "lower" and other directional terms are used in a relative rather than in an absolute sense in this description.

Figure 6:
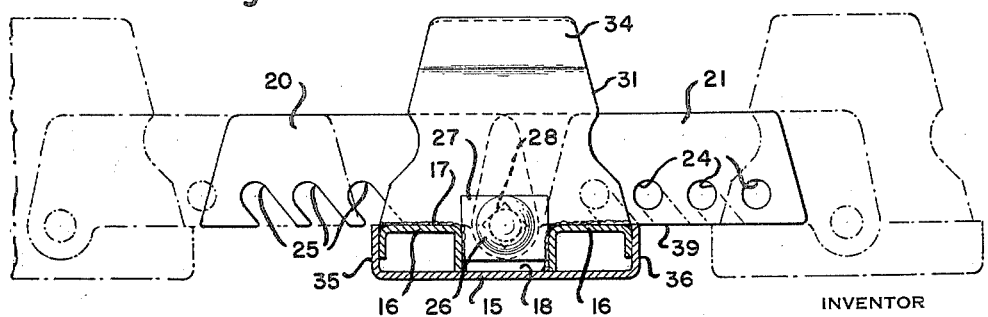
Figure 6 is a view taken along line VI—VI of Figure 5.

The pivot pins 26 can be drawn up quite tight so that there is no shakiness in the pivot joint because the respective inner ends of the respective connector plates in each unit overlap and are in surface contact at the inner ends throughout. Similarly, the connector bolts 37 can be drawn tight. The arcuate articulation of adjoining units 11 can only be inwardly toward the space faced by the top surface of the treads 13. The bottom edges 39 of the connector plates are straight and in line with the center of the pivot openings 23. Each pivot pin 26 in its depression 18 has its axis transverse along the center of the depression 18 and in the plane of the top surface 17 of the respective tread. Hence, when adjoining units are in a straight line as shown in Figure 6, no upward pressure on the bottom of tread 13 will move those units out of such straight line because under such pressure, the adjoining units 11 act as a rigid beam. Such is important, for example, in the straight reach between two tires in tandem wheeled vehicles, thereby avoiding forces which otherwise would tend to draw the axle centers of the tandem wheels together to the possible damage of the vehicle.

A further embodiment of this invention is illustrated in Figures 7 to 9 and is useful for dual-tired vehicles whether of the single or tandem axle type. In the construction shown in those Figures 7 to 9, parts generally corresponding in construction and functioning to parts shown in the above-described embodiment are provided with the same reference numerals with the addition of a prime accent thereto. In a unit 11' of such further embodiment, a corrugated pressing or stamping 16' takes the place of the two channels 16 in forming the top of the tread 13', such element 16' being secured to the channel 15' as by means of welding. In addition, the depression 18' is provided with a laterally spaced pair of pivot plates 27' to each side of the longitudinal vertical median plane of unit 11', such pivot plates 27' having registering openings therethrough for a pivot pin 26'. Each guide and connector plate subassembly 14' is symmetrical to fit between the inner sides of the dual wheels with which the device 10' is to be used. In addition, the guide 31' is also symmetrical and arched so that it may be readily formed of one piece having the lower portions 31'a to each side extending down to the top surface 17' of tread 13'. Each side 31'a of guide 31' is provided with a downwardly projecting pivot lug 32' having an opening through which the pivot 26' passes in the course of holding the subassembly together. The upper portion 31'b of each guide 31' constitutes the somewhat narrower arch integrally connecting the two sides thereof together above the limit of movement of the connector plates 20' and 21' during the articulation thereof.

In a heavier duty embodiment such as that illustrated in Figures 7 to 9, the inner sets of connector plates 20' may be symmetrically arranged and spaced, while the outer sets of connector plates 21' are arranged in a complementary fashion for the interfitting that occurs when adjoining units are connected together as shown in Figures 8 and 9. Preferably, in such heavier duty units, all of the connector plates are provided with connector openings in the nature of connector openings 24 rather than in the nature of slotted openings 25.

In such further embodiment, cleats 40 may be provided to engage the treads of the tires used with device 10'. Such cleats 40 may be formed in channel shape and fixed in depression 18' as by welding with the flange edges 41 extending somewhat above top surface 17'. Tread to ground traction may be improved if desired by the addition of a grouser 42 to the bottom surface of the treads 13'. Such a grouser 42 is formed of Z-shaped portions with the ends of the Z-shaped portions extending transversely and with laterally adjoining Z-shaped portions preferably separated by a gap 43. In this way, two Z-shaped portions as shown form a basin shape having a central opening 43 which inhibits clogging of the grouser ridges in the course of use. Further, such a grouser is longitudinally non-directional regardless of whether the arrangement of the grouser portions 42 is symmetrical about the longitudinal median plane or otherwise and such a grouser inhibits sideway slipping of the vehicle to which a device 10' with such grousers is attached.

For still heavier duty, on a dual-wheeled vehicle, additional asymmetrical guide and connector plate subassemblies in the form of those shown as subassemblies 14 may be applied to the units 11' outboard of the median plane thereof adjacent the sides 19' to cooperate with the respective outer sides of the dual tires with which device 10' is used.

In the still further embodiment illustrated in Figure 10, parts corresponding to the parts shown in Figures 7 to 9 are provided with the same reference numerals with a double accent thereon. Such a still further embodiment enables an arch type guide 31' for a 4 x 4 connector as shown in Figures 7 to 9 to be utilized with a lighter load having a 2 x 2 connector in which the outer connectors 21" and the inner connectors 20" respectively extend in opposite directions. In order to keep the connector plates such as plates 20" in longitudinal alignment during the connection thereof to the adjoining unit 11" when the connector bolts therefor are inserted and tightened, a spacer 44 is provided between the connectors 20" to fill the space therebetween, such spacer being preferably made of a strong lightweight material such as glass cloth embedded in a thermosetting plastic, such spacer having the same shape in side elevation as that of a connector plate 20".

Various changes may be made in the illustrated embodiments and other embodiments provided without departure from the spirit of my invention or the scope of the appended claims.

I claim:

1. A traction device for a vehicle with tires or the like having a plurality of units to be pivotally connected in endless fashion around said tires or the like, such a unit comprising, in combination, a transversely extending tread generally rectangular in plan, said tread having a flat top surface, said top surface having a transversely extending central depression, a pair of spaced pivot plates fixed in said depression, said pivot plates having a transverse horizontal opening therethrough, an even number of transversely spaced inner set of trapezoidal connector plates extending from said depression beyond the front of said tread, an outer set of an even number of trapezoidal connector plates extending beyond the back of said tread, said inner set of connector plates being positioned symmetrically between said outer set of connector plates, said respective sets of connector plates overlapping and having downwardly projecting integral pivot lugs at their inner ends extending into said depression, said pivot lugs having an opening therethrough in registry with the openings through said pivot plates, a trapezoidal spacer to fill the space between said transversely spaced said connector plates in said inner set, said sets of connector plates having longitudinally spaced connector openings therethrough adjacent their outer ends, a guide extending radially inwardly and arching over said sets of connector plates, said guide having the upper portion thereof narrower than the bottom portion, said guide further having a radially outward projection and an opening therethrough in registry with said pivot plate openings, the longitudinal lower edges of said guide being secured to the top of said tread, a pivot pin extending through said openings in said pivot plates and the openings in registry therewith, bolting means for said connector openings to fasten adjoining units together, cleat means secured in said depression having at least one transverse upstanding edge extending above the top of said tread, and grouser means on the bottom of said tread being basin-shaped in plan and having a longitudinal gap through the center thereof for self-cleaning purposes.

2. A traction device for a vehicle with tires or the like having a plurality of units to be pivotally connected in endless fashion around said tires or the like, such a unit comprising, in combination, a transversely extending tread, said tread having a flat top surface, said top surface having a transversely extending depression, a pivot plate fixed in said depression and having a transverse horizontal opening therethrough, a trapezoidal connector plate extending from said depression beyond the front of said tread, a trapezoidal connector plate extending beyond the back of said tread, the lower edges of said connector plates being straight and forming a rigid beam in a radially inward direction when in contact with said top surface, said respective connector plates forming an over-lapping subassembly and having radially outwardly extending integral pivot lugs at their inner ends, said pivot lugs having an opening therethrough in registry with the opening through said pivot plate, said connector plates having a connector opening therethrough adjacent their outer ends, a guide extending radially inwardly alongside and inclined toward said connector plates, said guide further having a radially outward pivot projection and an opening therethrough in registry with said pivot plate opening, said guide being secured to said tread, and a pivot pin extending through said opening in said pivot plate and the opening in registry therewith.

3. A traction device for a vehicle with tires or the like having a plurality of units to be pivotally connected in endless fashion around said tires or the like, such a unit comprising, in combination, a transversely extending tread, said tread having a top surface, said top surface having a transversely extending depression substantially midway between the front and back of said tread, a flat connector plate extending from said depression beyond the front of said tread, a flat connector plate extending beyond the back of said tread, the lower edges of said connector plates being straight to engage said top surface and form a rigid beam in a radially inward direction when in contact with said top surface, said respective connector plates forming an over-lapping subassembly and having radially outwardly extending integral pivot lugs at their inner ends, said pivot lugs having openings therethrough in registry, said connector plates having a connector opening therethrough adjacent their outer ends, a pivot pin extending through said openings in said pivot lugs, and means to removably secure said pivot pin in said depression.

4. A traction device as set forth in claim 3 having a guide extending radially inwardly along each tire side of each subassembly of connector plates, the upper portion of said guide being inclined toward the longitudinal vertical middle plane of said subassembly.

5. A traction device as set forth in claim 3 having a channel-shaped cleat secured in said depression with the flange edges of said cleat extending somewhat above said top surface of said tread.

6. A traction device as set forth in claim 3 having a grouser secured to the bottom of said tread, said grouser having a plurality of transversely spaced Z-shaped portions with the ends of said Z-shaped portions being positioned transversely.

7. A traction device as set forth in claim 3 for a vehicle with dual tires having asymmetrical guide and connector plate subassembly along the longitudinal median plane of said tread to fit between said dual tires and asymmetrical guide and connector plate subassemblies respectively connected to the outer side portions of said tread to be adjacent the outer sides of said dual tires.

8. A traction device as set forth in claim 3 for a vehicle with single tires having asymmetrical guide and connector plate subassemblies positioned adjacent the outer side portions of said tread positioned to be adjoining and face the outer sides of such a single tire.

9. A traction device for a vehicle with tires or the like having a plurality of units to be pivotally connected in endless fashion around said tires or the like, such a unit comprising, in combination, a transversely extending tread generally rectangular in plan, said tread having a generally flat bottom surface and a generally flat top surface, said top surface having a transverse central depression extending from one side of said tread to the other, an inner pair of flat trapezoidal connector plates extending from said depression beyond the front of said tread, an outer pair of flat trapezoidal connector plates extending beyond the back of said tread, the lower edges of said connector plates being straight to engage said top surface and form a rigid beam in a radially inward direction when in contact with said top surface, said inner pair of connector plates being positioned symmetrically between said outer pair of connector plates, said respective pairs of connector plates overlapping and having radially outwardly projecting integral pivot lugs at their inner ends, said pivot lugs having openings therethrough in registry with one another, said pairs of connector plates having longitudinally spaced connector openings therethrough adjacent the outer end portions thereof, a guide extending radially inwardly alongside said pairs of connector plates, said guide further having a radially outward projection and an opening therethrough in registry with said pivot lug openings, said guide being secured to the top of said tread, a pivot extending through said openings, and means for fastening said pivot transversely in said depression.

10. A traction device as set forth in claim 9 having said connector openings at least in said inner pair of connector plates slotted through the bottom edge of said inner pair of connector plates and with the slope of said slotted connector openings being radially outwardly and toward the inner ends of said inner pair of connector plates.

References Cited in the file of this patent

UNITED STATES PATENTS

| | | |
|---|---|---|
| 2,739,017 | Arps | Mar. 20, 1956 |
| 2,755,146 | Galanot | July 17, 1956 |